3,153,662
ADDITION PROCESS EMPLOYING NITRILE
SOLVENTS AND BASIC CATALYSTS
Roscoe A. Pike, Grand Island, N.Y., assignor to Union
Carbide Corporation, a corporation of New York
No Drawing. Filed Sept. 14, 1960, Ser. No. 55,851
12 Claims. (Cl. 260—448.2)

This invention relates to a process for producing organosilicon compounds. More particularly, this invention relates to a process for producing organosilicon adducts (i.e. addition products) from trichlorosilane and hydrocarbon or organosilicon compounds containing an aliphatic (i.e. non-benzenoid) carbon to carbon multiple bond.

Heretofore, organosilicon adducts have been produced by reacting trichlorosilane and hydrocarbon or organosilicon compounds containing an aliphatic carbon to carbon multiple bond (i.e. olefinic compounds or acetylenic compounds) in the absence of a catalyst. Such processes are unattractive since elevated temperatures of at least about 250° C. and usually from 300° C. to 400° C. are required to achieve satisfactory reaction rates. Moreover, even at such elevated temperatures, only low yields of the desired organosilicon adducts are produced in the absence of a catalyst. To avoid such elevated temperatures and to achieve satisfactory reaction rates and good yields at lower temperatures, it has been proposed to employ various compounds as catalysts for the reaction of trichlorosilane and hydrocarbon or organosilicon compounds containing an aliphatic carbon to carbon multiple bond. The various catalysts proposed to date (e.g. platinum and platinum compounds, peroxides such as diacetyl peroxide, ultra-violet light and organic bases such as pyridine) have proven ineffective in catalyzing the desired reaction or suffer from other disadvantages. By way of illustration, platinum and platinum compounds, although they produce satisfactory yield of the organosilicon adducts at moderate temperatures, are expensive and can be rendered ineffective by catalyst poisons. As another illustration, peroxide catalysts are often unstable or volatile materials or catalyze undesirable side reactions. As a still further illustration, when tertiary amines (e.g. pyridine) are used as catalysts, little of the desired organosilicon adducts are produced. As yet another illustration, when ultra-violet light is used as a catalyst, expensive reactors (e.g. quartz reaction vessels) are required to permit the catalyst to contact the reactants.

It is an object of the present invention to provide a process for producing good yields of organosilicon adducts by reacting trichlorosilane and hydrocarbon or organosilicon compounds containing an aliphatic carbon to carbon multiple bond at moderate temperatures.

Another object of this invention is to provide a process for producing organosilicon adducts by reacting trichlorosilane and a hydrocarbon or organosilicon compound containing an aliphatic carbon to carbon multiple bond in conventional reactors employing relatively stable and nonvolatile catalysts that are also relatively inexpensive and uneffected by catalyst poisons.

This invention is based on the discovery that the use of a basic catalyst (i.e. a tertiary amine or a tertiary phosphine) in conjunction with a hydrocarbon nitrile that is free of aliphatic carbon to carbon multiple bonds and that is a solvent for trichlorosilane and the catalyst makes possible the attainment of the above objects.

This invention provides a process for producing organosilicon adducts which involves forming a reaction mixture containing trichlorosilane, a hydrocarbon or organosilicon compound containing an aliphatic carbon to carbon multiple bond, a catalytic amount of tertiary amine or phosphine that is free of aliphatic carbon to carbon multiple bonds and a hydrocarbon nitrile that is free of aliphatic carbon to carbon multiple bonds and that is a solvent for trichlorosilane and the amine or phosphine and maintaining the reaction mixture at a temperature at which the trichlorosilane and the hydrocarbon or organosilicon compound containing an aliphatic carbon to carbon multiple bond react to produce the adduct by the rupture of the hydrogen to silicon bond of the trichlorosilane and the addition of the hydrogen atom and the trichlorosilyl group so formed to the multiple bond. The process involves an addition reaction which can be represented, in the case of olefinic starting materials, by the skeletal equation:

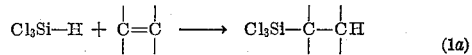
(1a)

and, in the case of acetylenic starting materials, by the skeletal equation:

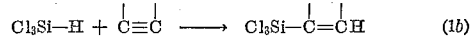
(1b)

The compounds containing an aliphatic carbon to carbon bond employed as starting materials in the process of this invention include both hydrocarbon and organosilicon olefinic compounds and acetylenic compounds.

Illustrative of suitable hydrocarbon olefinic compounds are the alkenes (e.g. ethylene, propylene, butylene and 1-octylene), the aralkenes (e.g. styrene and vinyl toluene), the cycloalkenes (e.g. cyclopentene and cyclohexene) and vinylcycloalkenes (e.g. vinyl cyclohexene). Illustrative of suitable hydrocarbon acetylenic compounds are the alkynes (e.g. acetylene, butyne-1, heptyne-1 and methyl acetylene) and the aralkynes (e.g. phenyl acetylene).

Illustrative of one type of organosilicon olefinic and acetylenic compounds that are useful as reactants in the process of this invention are silanes that have the formula:

(2)

wherein R' is a monovalent hydrocarbon group containing an aliphatic carbon to carbon multiple bond (i.e. an olefinic or an acetylenic bond), R is a monovalent hydrocarbon group free of aliphatic carbon to carbon multiple bonds, X is a halogen atom or a hydrocarbonoxy group and $n$ has a value from 0 to 2 inclusive.

Typical of the groups represented by R in Formula 2 are linear alkyl groups (for example the methyl, ethyl, propyl, butyl and stearyl groups), the cyclic alkyl groups (for example the cyclohexyl and cyclopentyl groups), the aryl groups (for example the phenyl and naphthyl groups), the alkaryl groups (for example the tolyl group) and the aralkyl groups (for example the benzyl and beta-phenylethyl groups).

Typical of the groups represented by R' in Formula 2 are the vinyl, allyl, CH≡C— and CH≡C—CH₂— groups.

Typical of the groups represented by X in Formula 3 are the halogen atoms, preferably chlorine or bromine, and the hydrocarbonoxy groups, such as the alkoxy groups (e.g. the ethoxy, methoxy and propoxy groups) and the aroxy groups (e.g. the phenoxy group).

Typical of the silanes of Formula 2 are vinyltrichlorosilane, vinylmethyldichlorosilane, allyldiphenylethoxysilane. CH≡C—SiCl₃, CH≡C—Si(CH₃)Cl₂ and $$CH_2{=}CHSi(OC_2H_5)_3$$

Illustrative of another type of organosilicon olefinic and acetylenic compounds that are useful as reactants in the process of this invention are siloxanes that contain a group represented by the formula:

(3)

wherein R, R' and n have the above-defined meanings. Typical of groups represented by Formula 3 are the $CH_2\!\!=\!\!CHSiO_{1.5}$, $CH_2\!\!=\!\!CHSi(CH_3)O$ $CH_2\!\!=\!\!CHSi(CH_3)_2O_{0.5}$, $CH\!\equiv\!CSiO_{1.5}$ and $CH\!\equiv\!CSi(CH_3)O$ groups. Such siloxanes can be composed solely of groups represented by Formula 3 or the siloxanes can contain one or more groups represented by Formula 3 and one or more groups represented by the formula:

$$R_mSiO_{\frac{4-m}{2}} \qquad (4)$$

wherein R has the above-defined meaning and m has a value from 1 to 3 inclusive. Typical of the group represented by Formula 4 are the methyl siloxy, dimethylsiloxy, diphenylsiloxy, and trimethylsiloxy groups.

The hydrocarbon or organosilicon compounds containing an aliphatic carbon to carbon multiple bond employed in the process of this invention preferably contains only one aliphatic carbon to carbon multiple bond but compounds containing more than one aliphatic carbon to carbon multiple bond (e.g. butadiene, isoprene and vinyl acetylene) can be employed. Suitable reactants containing a carbon to carbon multiple bond are composed of carbon and hydrogen and, in the case of the organosilicon reactants, can also contain silicon and oxygen or halogen. The reactants are free of other atoms (e.g. such as nitrogen that is combined in a nitrile group). Preferably the compounds containing an aliphtic carbon to carbon multiple bond contains from 2 to 20, and more preferably from 2 to 10, carbon atoms.

The hydrocarbon nitriles employed as solvents in the process of this invention include the alkyl nitriles (e.g. acetonitrile, propionitrile and butyronitrile), the aryl nitriles (e.g. benzonitrile and o-tolunitrile) and the aralkyl nitriles (e.g. benzylcyanide). These nitriles are free of aliphatic carbon to carbon multiple bonds. Preferably the hydrocarbon nitrile contains from 2 to 10 carbon atoms per molecule and contains only one CN group per molecule. However, hydrocarbon nitriles containing 20 or more carbon atoms per molecule and/or two or more CN groups per molecule (e.g. succinonitrile and adiponitrile) can be employed. The catalysts employed are soluble in these hydrocarbon nitriles. Trichlorosilane and many of the compounds containing an aliphatic carbon to carbon multiple bond are also soluble in these hydrocarbon nitriles. Good results can be obtained, however, when compounds containing an aliphatic carbon to carbon multiple bond that are insoluble in the hydrocarbon nitrile (e.g. octene-1) are employed.

These hydrocarbon nitriles have a remarkable and unexpected effect on the catalysts employed in the process of this invention. That is, although little or none of the desired organosilicon adducts are obtained when such catalysts are employed in the absence of a solvent or in the presence of other solvents (e.g. benzene), good yields of the adducts are produced when these catalysts are employed dissolved in the hydrocarbon nitrile.

The tertiary amines and phosphines that are free of aliphatic carbon to carbon multiple bonds which are employed as catalysts in this invention include trialkyl amines and phosphines, triaryl amines and phosphines, mixed tertiary aryl-alkyl amines and phosphines, tertiary silyl amines and heterocyclic amines.

Illustrative of suitable trialkyl, triaryl and tertiary mixed aryl-alkyl amines and phosphine catalysts are those that are represented by the formula:

$$\begin{array}{c}R\\ \diagdown\\ \phantom{R}E\!-\!R\\ \diagup\\ R\end{array} \qquad (5)$$

wherein R has the above-defined meaning and E is nitrogen or phosphorus. Typical of these catalysts are such amines as triethyl amine, tripropyl amine, tributyl amine, triphenyl amine and ethyl diphenyl amine and such phosphines as triethyl phosphine, tripropyl phosphine, tributyl phosphine, triphenyl phosphine and ethyl diphenyl phosphine.

Illustrative of suitable tertiary silyl amine catalysts are those represented by the formula:

$$\left[(RO)_{3-x}\overset{R_x}{\underset{|}{Si}}\right]_y NR_{3-y}$$

wherein R has the above-defined meaning, x has a value from 0 to 3 inclusive, and y has a value from 1 to 3 inclusive. Typical of these catalysts are $[(C_2H_5O)_3Si]_2NC_6H_5$ $[(CH_3)_3Si]_2NC_3H_7$, $(C_2H_5)_2Si(C_6H_5)N(C_2H_5)_2$ and $[C_2H_5OSi(CH_3)_2]_3N$ Illustrative of suitable heterocyclic amine catalysts are pyridine, the alkyl-substituted pyridines, quinoline, the alkyl-substituted quinolines, isoquinoline and the alkyl-substituted isoquinolines. Typical alkyl-substituted pyridines, quinolines and isoquinolines include alpha- and beta-picoline, alpha-ethyl pyridine, alpha-methyl quinoline and alpha-methyl isoquinoline.

The preferred catalysts are those represented by Formula 5 wherein R is an alkyl group containing from 3 to 5 carbon atoms inclusive or a phenyl group.

The relative amounts of the reactants, catalyst and solvent employed in the process of this invention are not narrowly critical. Stoichiometric amounts of reactants are preferred in order to minimize the problem of separating unreacted reactants at the conclusion of the reaction but, if desired, an excess of either reactant can be employed. From 0.1 part to 5 parts by weight of the catalyst, or preferably from 1 part to 3 parts by weight of the catalyst, per 100 parts by weight of the trichlorosilane and the hydrocarbon or organosilicon compound containing an aliphatic carbon to carbon multiple bond are employed. From 0.1 mole to 5.0 moles of the solvent, or preferably from 0.3 mole to 1.0 mole of the solvent per mole of the trichlorosilane reacted are employed. Other than the indicated relative amounts of the reactants, catalysts and solvents can be employed but no commensurate advantage is obtained thereby.

The temperature employed in the process of this invention is not narrowly critical. Temperatures from 50° C. to 200° C. are useful but temperatures from 100° C. to 160° C. are preferred. Although other temperatures can be used, no commensurate advantage is gained thereby.

Disproportionation of the trichlorosilane used as a starting material can occur to some extent during the process of this invention. The disproportionation reaction produces a mixture of silicon products including silicon tetrachloride and dichlorosilane. The disproportionation reaction can be minimized by adding the trichlorosilane incrementally in relatively small amounts during the reaction to a large excess of the compounds containing an aliphatic carbon to carbon multiple bond and/or by adding one of the products of the disproportionation reaction (e.g. silicon tetrachloride) to the initial reaction mixture.

When a hydrocarbon or organosilicon compound containing an aliphatic carbon to carbon multiple bond is employed in the process of this invention which readily homopolymerizes (e.g. styrene or butadiene), it is desirable, but not essential, to employ a polymerization inhibitor along with the trichlorosilane and the compound containing an aliphatic carbon to carbon multiple bond, catalyst and solvent. From 1 part to 4 parts by weight of a suitable conventional polymerization inhibitor (e.g. 2,6-di-tertiary-butyl-4-methyl phenol or tertiary-butyl catechol) per 100 parts by weight of the compounds containing an aliphatic carbon to carbon multiple bond can be successfully employed to suppress the homopolymerization of the compounds containing an aliphatic carbon to carbon multiple bond.

The process of this invention is conveniently conducted in a conventional pressure vessel or autoclave, particularly where volatile reactants, catalysts and/or solvents are employed. When such pressure vessels or autoclaves are employed, the process is conveniently conducted at the autogenous pressure generated in the vessel at the reaction temperature.

At the completion of the process of this invention, the desired organosilicon adduct can be separated from the reaction mixture by any suitable conventional means (e.g. extraction, filtration or fractional crystallization). Fractional distillation at atmospheric or reduced pressure is often a particularly satisfactory means for isolating the desired organosilicon adducts.

As is shown by Equations 1a and 1b, the type of organosilicon adduct produced by the process of this invention is dependent on the particular type aliphatic carbon to carbon multiple bond present in the reactant. Thus, when an olefinic compound is reacted with a trichlorosilane, the adduct so formed is free of olefinic unsaturation. On the other hand, when an acetylenic compound is reacted with a trichlorosilane, the adduct so formed is olefinically unsaturated. The latter adducts can be illustrated by Formula 2 where R' is a monovalent hydrocarbon group containing olefinic unsaturation and can be reacted further with the trichlorosilane to produce bis(trichlorosilyl) compounds or they can be separated as such. In the latter case, short reaction times and/or excess of the acetylene compound is employed as a reactant.

When the aliphatic carbon to carbon multiple bond in the olefinically or acetylenically unsaturated reactant links two carbon atoms to which different numbers of hydrogen atoms are attached, the hydrogen atom of the trichlorosilane becomes bonded principally to the carbon atom having the lesser number of hydrogen atoms attached thereto and the trichlorosilyl group of the trichlorosilane becomes bonded principally to the carbon atom having the greater number of hydrogen atoms attached thereto. By way of illustration, when trichlorosilane and styrene are reacted in accordance with the process of this invention, the principal product is beta-phenylethyltrichlorosilane.

The organosilicon adducts produced in accordance with the process of this invention can be hydrolyzed and condensed by conventional procedures to produce organosiloxane resins. Such resins can be utilized according to known techniques as protective coatings, molding resins and laminating resins.

The following examples illustrate the present invention:

Example I

Styrene (52 grams, 0.5 mole), $HSiCl_3$ (67.8 grams, 0.5 mole), 2,6-di-tertiary-butyl-4-methyl phenol (1.2 grams), tributylamine (2.4 grams, 2 wt.-percent) and dry acetonitrile (45 grams) were placed in a 300 cubic centimeter stainless steel pressure vessel. The vessel was sealed and heated in a rocking furnace at 155–160° C. for 2.5 hours. The vessel was then cooled and 161 grams of liquid contents were withdrawn. The liquid was fractionally distilled and there was so obtained phenylethyltrichlorosilane (43.5 grams, 36.5 mole-percent conversion), which had a boiling point from 110° C. at 8 mm. of Hg to 120° C. at 19 mm. of Hg and a refractive index, $N_D{}^{25}$, of 1.5448. Infra-red analysis showed that the silane was primarily the beta isomer with some of the alpha isomer mixed therewith.

Example II

Octene-1 (55 grams, 0.5 mole), $HSiCl_3$ (67.8 grams, 0.5 mole), tributyl amine (2.3 grams) and acetonitrile (20.5 grams, 0.5 mole) were placed in a stainless steel pressure vessel. The octene-1 was not miscible in the acetonitrile and two phases formed. The vessel was sealed and heated in a rocking furnace for 2 hours at 160° C. The vessel was then cooled and 144 grams of liquid contents were withdrawn. The liquid was fractionally distilled and there was so obtained n-octyltrichlorosilane (31.5 grams, 25.7 mole-percent conversion) which had a boiling point of 106° C. to 108° C. at 24 mm. of Hg and an index of refraction, $n_D{}^{25}$, of 1.4492.

Example III

Employing the procedure used in Example II but with adiponitrile (0.25 mole per 0.5 mole of octene-1) substituted for acetonitrile, there was produced 46.4 mole-percent yield of n-octyltrichlorosilane.

Example IV

Trichlorosilane (14.5 grams, 1.07 mole), dry adiponitrile (55 grams) and triphenylphosphine (4 grams) were placed in an 800 cubic centimeter steam-jacketed steel pressure vessel. The vessel was sealed, placed in a rocking furnace and purged three times with acetylene at a pressure of 50 pounds per square inch gage. Acetylene was then added to the vessel till the pressure in the vessel reached 150 pounds per square inch. The vessel was rocked and an exothermic reaction occurred which raised the temperature to 105° C. and the pressure to 300 pounds per square inch gage. The vessel was heated to 155° C. and the pressure rose to 370 pounds per square inch gage. The heating was continued for 2.5 hours and the pressure fell to 190 pounds per square inch. The vessel was cooled and 194 grams of liquid contents were withdrawn. The liquid was fractionally distilled at atmospheric pressure and there was obtained 49 grams of (49 mole-percent yield) of bis(trichlorosilyl)ethane, $Cl_3SiCH_2CH_2SiCl_3$, which was found to have a boiling point of 199° C. to 200° C. and a hydrolyzable chlorine content of 70.1 wt.-percent (theoretical hydrolyzable chlorine content: 69.5 wt. percent). The production of this compound indicated that the following reactions had occurred:

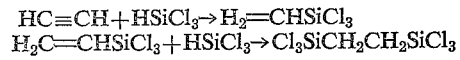

There was also obtained 15 grams of impure vinyltrichlorosilane and 41 grams of $SiCl_4$. This latter product indicated that disproportionation had occurred. A high boiling residue (71 grams) was left after the fractional distillation.

Example V

When trichlorosilane and tripropyl amine (1 part by weight per 100 parts by weight of the reactants) that is dissolved in benzonitrile (0.5 mole per mole of the trichlorosilane) are placed in an autoclave, an ethylene is charged to the autoclave under pressure to produce a reaction mixture and the reaction mixture so formed is heated at 125° C. for 1 hour, there is produced ethyltrichlorosilane. The ethyltrichlorosilane so produced can be identified by conventional and elemental and infra-red analysis.

Example VI

Styrene (52 grams, 0.5 mole), $HSiCl_3$ (67.8 grams, 0.5 mole), acetonitrile (45 grams) and pyridine (2.4 grams) were placed in a 300 cubic centimeter stainless steel pressure vessel. The vessel was sealed and heated at 150° C. for 2 hours. The vessel was then cooled and the liquid contents were withdrawn. The liquid was fractionally distilled. A mixture of acetonitrile and trichlorosilane (61.5 grams) was obtained during the distillation as a first fraction. This fraction distilled as the temperature in the distilling flask rose to 80° C. at atmospheric pressure. The pressure was reduced to 5 millimeters of mercury and styrene (3 grams) was distilled at 35° C. as a second fraction. A third fraction was principally beta-phenylethyltrichlorosilane (46 grams)

and distilled at 84–86° C. at 2.5 millimeters of mercury pressure.

The preceding examples illustrate the improved yields obtained employing a nitrile solvent in accordance with the process of this invention. The following experiment illustrates the poor yields obtained when a hydrocarbon solvent is substituted for the nitrile solvent in the procedure used in Example I.

Styrene (52 grams, 0.5 mole), HSiCl$_3$ (67.8 grams, 0.5 mole), benzene (45 grams), 2,6-di-tertiary-butyl-4-methyl phenol (1 gram) and tributyl amine (2.4 grams) were placed in a 300 cubic centimeter stainless steel pressure vessel. The vessel was sealed and heated at 150° C. for two hours. The vessel was cooled and the liquid contents were withdrawn. The liquid contents were fractionally distilled and the following materials were isolated: a mixture of benzene and trichlorosilane (95 grams) which distilled as the temperature in the distilling flask rose to 85° C. at atmospheric pressure; styrene (4.5 grams) which distilled at 38° C. at 5 millimeters of mercury pressure; beta-phenylethyltrichlorosilane (3 grams) which distilled at 81–85° C. at 5 millimeters of mercury pressure; and a gel as a residue (probably polystyrene) which did not distill when the distilling flask was heated at 280° C.

*Example VII*

When trichlorosilane, HSiCl$_3$, (1 mole) and the siloxane, H$_2$C=CHSi(CH$_3$)$_2$OSi(CH$_3$)$_3$, (1 mole) are heated together at 150° C. for 2 hours employing acetonitrile (1 mole) as a solvent and tributyl amine (.01 mole) as a catalyst, there is produced the siloxane, Cl$_3$SiCH$_2$CH$_2$Si(CH$_3$)$_2$OSi(CH$_3$)$_3$

*Example VIII*

When trichlorosilane (2 moles) and the siloxane, H$_2$C=CHSi(CH$_3$)$_2$OSi(CH$_3$)$_2$CH=CH$_2$, (1 mole) are heated together at 150° C. for 2 hours employing acetonitrile (1 mole) as a solvent and triphenyl phosphine (.02 mole) as a catalyst, there is produced the siloxane, Cl$_3$SiCH$_2$CH$_2$Si(CH$_3$)$_2$OSi(CH$_3$)$_2$CH$_2$CH$_2$SiCl$_3$.

*Example IX*

When HSiCl$_3$ (1 mole) and CH$_2$=CHSi(OC$_2$H$_5$)$_3$ (1 mole) are heated together at 150° C. for 2 hours employing acetonitrile (1 mole) as a solvent and tributyl amine (.01 mole) as a catalyst, there is produced Cl$_3$SiCH$_2$CH$_2$Si(OC$_2$H$_5$)$_3$

What is claimed is:

1. A process for producing organosilicon adducts which comprises (a) forming a reaction mixture containing (1) trichlorosilane; (2) an unsaturated hydrocarbon compound containing at least one olefinic bond; (3) a catalytic amount of a catalyst selected from the group consisting of tertiary amines and tertiary phosphines, said catalyst being free of aliphatic carbon to carbon multiple bonds; and (4) a hydrocarbon nitrile that is free of aliphatic carbon to carbon multiple bonds and that is a solvent for trichlorosilane and the catalyst and (b) maintaining the reaction mixture at a temperature at which the trichlorosilane and the unsaturated compound react to produce an adduct by the rupture of the hydrogen to silicon bond of the trichlorosilane and the addition of the hydrogen atom and the trichlorosilyl group so formed to a multiple bond of the unsaturated compound.

2. The process of claim 1 wherein the catalyst is a triaryl amine.

3. The process of claim 1 wherein the catalyst is a trialkyl phosphine.

4. The process of claim 1 wherein the catalyst is a heterocyclic amine composed only of carbon, hydrogen and nitrogen.

5. The process of claim 1 wherein the catalyst is a tertiary silyl amine.

6. The process of claim 1 wherein the catalyst is pyridine.

7. The process of claim 1 wherein the hydrocarbon nitrile is an aryl nitrile.

8. The process of claim 1 wherein the hydrocarbon nitrile is an aralkyl nitrile.

9. A process for producing organosilicon adducts which comprises (a) forming a reaction mixture containing (1) trichlorosilane; (2) a hydrocarbon olefinic compound containing only one olefinic bond and containing from 2 to 20 carbon atoms inclusive; (3) a catalytic amount of a trialkyl amine; and (4) an akyl nitrile that is a solvent for trichlorosilane and the trialkyl amine and that contains from 2 to 10 carbon atoms and (b) maintaining the reaction mixture at a temperature from 50° C. to 200° C. to cause the trichlorosilane and the olefinic compound to react to produce an adduct by the rupture of the hydrogen to silicon bond of the trichlorosilane and the addition of the hydrogen atom and the trichlorosilyl group so formed to the olefinic bond of the olefinic compound.

10. A process for producing an organosilicon adduct which comprises (a) forming a reaction mixture containing (1) trichlorosilane; (2) a hydrocarbon olefinic compound containing only one olefinic bond and containing from 2 to 20 carbon atoms inclusive; (3) a catalytic amount of a triaryl phosphine; and (4) an alkyl nitrile that is a solvent for trichlorosilane and the triaryl phosphine and that contains from 2 to 10 carbon atoms inclusive and (b) maintaining the reaction mixture at a temperature from 50° C. to 200° C. to cause the trichlorosilane and the olefinic compound to react to produce an adduct by the rupture of the hydrogen to silicon bond of the trichlorosilane and the addition of the hydrogen atom and the trichlorosilyl group so formed to the olefinic bond of the olefinic compound.

11. A process for producing phenylethyltricholorosilane which comprises forming a reaction mixture containing trichlorosilane, styrene, a catalytic amount of tributyl amine and acetonitrile as a solvent for the trichlorosilane and the tributyl amine and heating the reaction mixture to a temperature from 100° C. to 160° C. to cause the trichlorosilane and the styrene to react to produce phenylethyltrichlorosilane.

12. A process for producing n-octlytrichlorosilane which comprises forming a reaction mixture containing trichlorosilane, octene-1, a catalytic amount of tributyl amine and acetonitrile as a solvent for the trichlorosilane and the tributyl amine and heating the reaction mixture to a temperature from 100° C. to 160° C. to cause the trichlorosilane and the octene-1 to react to produce n-octyltrichlorosilane.

References Cited in the file of this patent

UNITED STATES PATENTS

| | | |
|---|---|---|
| 2,721,873 | Mackenzie et al. | Oct. 25, 1955 |
| 2,823,218 | Speier et al. | Feb. 11, 1958 |
| 2,907,784 | Jex et al. | Oct. 6, 1959 |
| 2,971,970 | Bluestein | Feb. 14, 1961 |
| 3,099,670 | Prober | July 30, 1963 |

FOREIGN PATENTS

| | | |
|---|---|---|
| 1,118,500 | France | Mar. 19, 1956 |

OTHER REFERENCES

Petrov et al.: "Izvest. Akad. Nauk SSSR," 1957, pp. 1490–1. (52 Chem. Abstracts 7,135.)